(12) United States Patent
Dillon

(10) Patent No.: US 6,337,911 B1
(45) Date of Patent: *Jan. 8, 2002

(54) DEFERRED BILLING, BROADCAST, ELECTRONIC DOCUMENT DISTRIBUTION SYSTEM AND METHOD

(75) Inventor: Douglas M. Dillon, Gaithersburg, MD (US)

(73) Assignee: Hughes Electronics Corporation, El Segundo, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/037,283

(22) Filed: Mar. 9, 1998

Related U.S. Application Data

(62) Division of application No. 08/869,865, filed on Jun. 5, 1997, now Pat. No. 5,727,065, which is a continuation of application No. 08/724,694, filed on Oct. 1, 1996, now abandoned, which is a continuation of application No. 08/340,349, filed on Nov. 14, 1994, now abandoned.

(51) Int. Cl.[7] .................................................. H04K 1/00
(52) U.S. Cl. ..................... 380/262; 380/279; 380/281; 380/283; 380/284; 705/52; 705/55; 705/57; 705/77; 705/78; 713/160; 713/163
(58) Field of Search ................................ 380/230, 233, 380/241, 262, 279, 281, 283, 284; 705/52, 55, 57, 58, 59, 77, 78; 713/160, 163

(56) References Cited

U.S. PATENT DOCUMENTS

| | | | |
|---|---|---|---|
| 4,225,884 A | 9/1980 | Block et al. ................... 380/20 |
| 4,358,672 A | 11/1982 | Hyatt et al. | |
| 4,458,109 A * | 7/1984 | Mueller-Schloer ....... 178/22.11 |
| 4,599,647 A | 7/1986 | George et al. | |
| 4,720,873 A | 1/1988 | Goodman et al. .............. 455/2 |
| 4,736,422 A | 4/1988 | Mason | |
| 4,751,732 A | 6/1988 | Kamitake ..................... 380/20 |
| 4,802,215 A | 1/1989 | Mason | |
| 4,829,569 A | 5/1989 | Seth-Smith et al. .......... 380/10 |
| RE33,189 E | 3/1990 | Lee et al. ...................... 380/20 |
| 4,916,737 A | 4/1990 | Chomet et al. ............... 380/20 |
| 5,029,207 A | 7/1991 | Gammie | |
| 5,111,504 A * | 5/1992 | Esserman et al. ............. 380/21 |
| 5,131,010 A | 7/1992 | Derrenge et al. | |
| 5,136,643 A * | 8/1992 | Fischer ........................ 380/23 |
| 5,237,610 A | 8/1993 | Gammie et al. | |
| 5,247,575 A * | 9/1993 | Sprague et al. ................ 380/9 |
| 5,319,705 A * | 6/1994 | Halter et al. ................... 380/4 |

(List continued on next page.)

OTHER PUBLICATIONS

"Installation Problems", p. 2, para. 10, Hewlett–Packard Co., Apr. 1990, (Software Patent Institute).*

Primary Examiner—Albert DeCady
Assistant Examiner—Paul E. Callahan
(74) Attorney, Agent, or Firm—John T. Whelan; Michael W. Sales

(57) ABSTRACT

An electronic document delivery system and method in which a broadcast center periodically sends a "catalog" of available documents to a receiving computer, thereby allowing a user to browse through the available documents without having to access the broadcast center. The documents are transmitted as packets, and the packets are decrypted as soon as they are received, eliminating the need to store both an encrypted and an decrypted version of the documents at the receiving computer. The receiving computer periodically receives information allowing it to decrypt received documents and to encrypt billing information for the receiving computer. The invention is not limited to text-only documents and can receive all types of documents, such as software, images, text, and full-motion video.

20 Claims, 6 Drawing Sheets

U.S. PATENT DOCUMENTS

| | | |
|---|---|---|
| 5,319,707 A | 6/1994 | Wasilewski et al. |
| 5,319,712 A | 6/1994 | Finkelstein et al. ............ 380/44 |
| 5,337,044 A | 8/1994 | Folger et al. |
| 5,339,239 A | 8/1994 | Manabe et al. ............. 364/401 |
| 5,341,425 A | 8/1994 | Wasilewski et al. |
| 5,367,571 A | 11/1994 | Bowen et al. |
| 5,394,469 A | 2/1995 | Nagel et al. |
| 5,400,401 A | 3/1995 | Wasilewski et al. ............ 380/9 |
| 5,400,403 A * | 3/1995 | Fahn et al. .................... 380/21 |
| 5,404,505 A | 4/1995 | Levinson .................... 395/600 |
| 5,420,866 A | 5/1995 | Wasilewski |
| 5,452,357 A | 9/1995 | Naccache |
| 5,481,609 A | 1/1996 | Cohen et al. .................. 380/16 |
| 5,497,420 A | 3/1996 | Garneau et al. .............. 380/20 |
| 5,504,814 A | 4/1996 | Miyahara |
| 5,506,904 A | 4/1996 | Sheldrick et al. |
| 5,517,502 A | 5/1996 | Bestler et al. |
| 5,568,554 A | 10/1996 | Eastlake, III |
| 5,590,200 A | 12/1996 | Nachman et al. |
| 5,646,992 A * | 7/1997 | Subler et al. ................... 380/4 |
| 5,671,282 A * | 9/1997 | Wolff et al. ................... 380/25 |

* cited by examiner

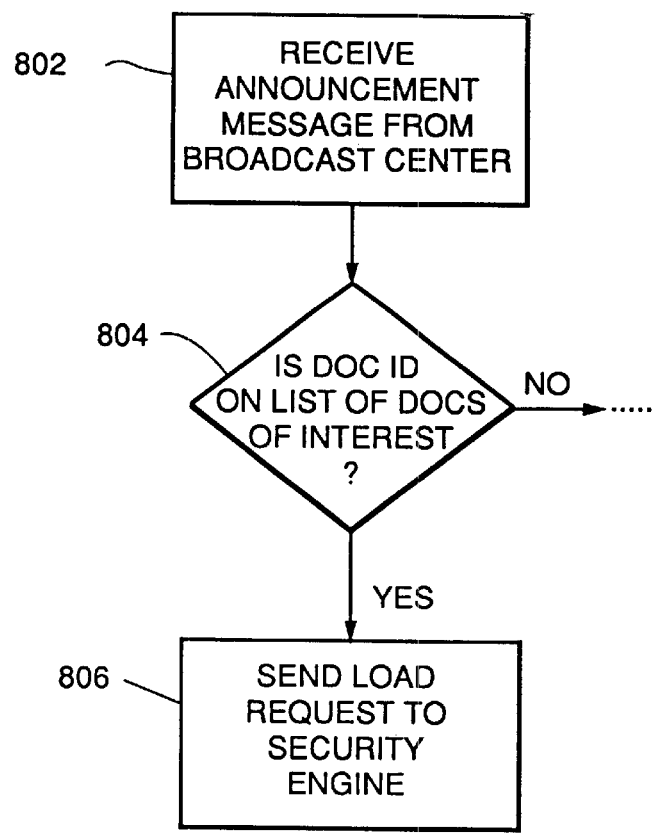
FIG. 7(A).
FIG. 7(b).
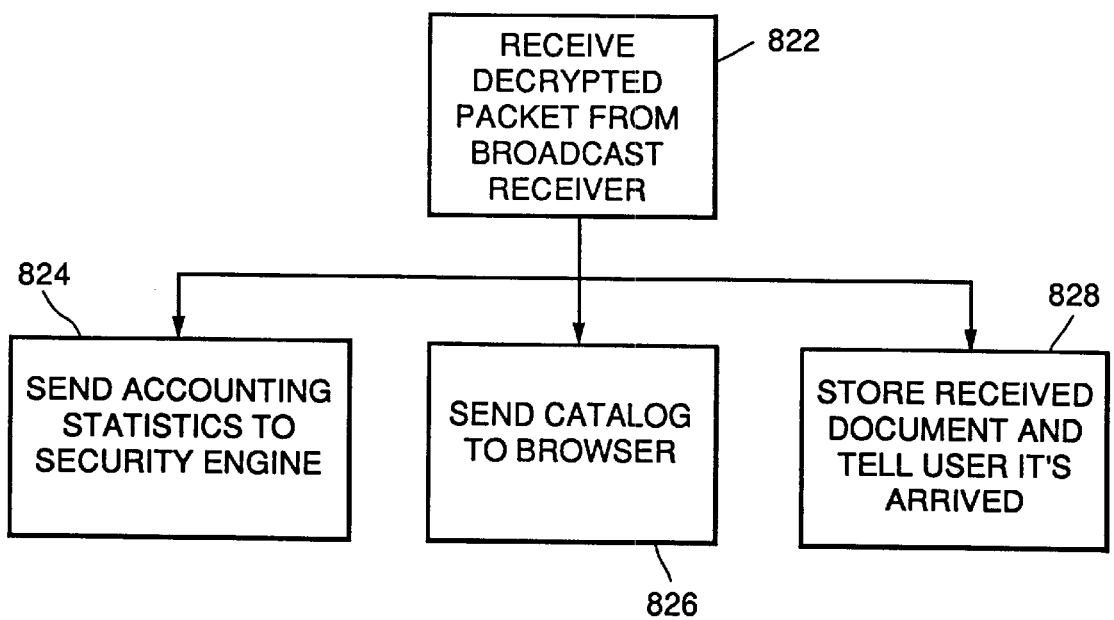

DEFERRED BILLING, BROADCAST, ELECTRONIC DOCUMENT DISTRIBUTION SYSTEM AND METHOD

This application is a division of application Ser. No. 08/869,865 filed Jun. 5, 1997, U.S. Pat. No. 5,727,065, which is a continuation of application Ser. No. 08/724,694 filed Oct. 1, 1996, now abandoned, which is a continuation of application Ser. No. 08/340,349 filed Nov. 14, 1994, now abandoned.

BACKGROUND OF THE INVENTION

This application relates to a computer network and, more specifically, to a method and apparatus for implementing an electronic document delivery system where both documents and billing information are encrypted during transmission.

An electronic document delivery system transmits documents from a central depository to individual nodes or receiving computers. In some conventional document delivery systems, a user accesses a computer at the central depository, examines a list of available documents stored at the central depository, and requests that one or more of the documents be transmitted to him. In other conventional document delivery systems, a predetermined group of documents are sent from the central depository to the user and stored on the user's system. The user is then free to examine documents in the predetermined group. Still other conventional electronic document delivery systems can be used to send only certain types of documents, such as text-only documents.

Some electronic document delivery systems transmit documents to the user in encrypted form. The encrypted documents are received at the receiving computer and stored in a memory. Thereafter, the documents are decrypted and the decrypted form of the documents are also stored in a memory. Such double storage of documents is wasteful of memory and storage space.

What is needed is an electronic document delivery system in which a user can determine which documents he wishes to receive and in which the user is charged only for those documents that he receives. It is also desirable to allow the user to designate which documents he wishes to receive without having to access a central computer to view a list of available documents. Furthermore, it is desirable that such a system use encryption for all critical information passing between the central computer and the receiving computer. It also is desirable to avoid having both an encrypted and a decrypted version of a document stored at the receiving computer, as this is wasteful of memory space.

SUMMARY OF THE INVENTION

The present invention overcomes the problems and disadvantages of the prior art by having a central computer (or "broadcast center") periodically send a "catalog" of available documents to a receiving computer. The user can then browse through the available documents without having to access the broadcast center. The documents are transmitted as packets, and the packets are decrypted as soon as they are received, eliminating the need to store both an encrypted and a decrypted version of the documents at the receiving computer. Moreover, the invention is not limited to text-only documents and can receive all types of documents, such as software, images, text, and full-motion video. The receiving computer periodically receives information allowing it to decrypt received documents and to encrypt billing information to be sent to the broadcast center.

A purpose of the present invention is to allow all forms of electronic documents to be distributed in a cost-effective manner using broadcast technology in a way that prevents access to a document without paying for it.

In accordance with the purpose of the invention, as embodied and broadly described herein, the invention resides in a document delivery system comprising:

a broadcast center that sends a document as a plurality of encrypted packets;

a communication link connected to the broadcast center for carrying the packets;

a receiving computer, connected to the communication link, and including a memory and a broadcast receiver, wherein the broadcast receiver decrypts each packet as it is received and stores only the decrypted packets in the memory.

In further accordance with the purpose of the invention, as embodied and broadly described herein, the invention resides in a document delivery system in a network, comprising:

a broadcast center that sends a catalog containing a list of documents to be sent by the broadcast center;

a communication link connected to the broadcast center for carrying the catalog;

a receiving computer, connected to the communication link, and including a memory and a file browser, wherein the file browser receives the catalog and stores the catalog in the memory, displays the stored catalog, and receives user input indicating a document in the catalog.

In further accordance with the purpose of the invention, as embodied and broadly described herein, the invention resides in a method for document delivery in a network system, comprising:

the steps of sending, by a broadcast center in the network, a document as a plurality of encrypted packets;

connecting a communication link to the broadcast center;

decrypting a received packet in a receiving computer connected to the communication link, the receiving computer including a memory and a broadcast receiver, wherein the broadcast receiver performs the decrypting step on the packet as it is received and stores only the decrypted packet in the memory;

sending, by the broadcast center, account information including key seeds to a security engine in the receiving computer; and generating, by the security engine, keys used by the broadcast receiver to decrypt the received packets in accordance with a one-way hashing method based on a document ID of the sent document and one of the key seeds.

It is understood that both the foregoing general description and the following detailed description are exemplary and explanatory and are intended to provide further explanation of the invention as claimed.

BRIEF DESCRIPTION OF THE DRAWINGS

The accompanying drawings, which are incorporated in and constitute a part of this specification, illustrate several embodiments of the invention and, together with the description, serve to explain the principles of the invention.

FIGS. 7(a) and 7(b) are flowcharts of steps performed by the file broadcast receiver of FIGS. 1 and 4 in the functions of receiving an announcement message and sending a load request, and receiving and processing a decrypted packet from the broadcast receiver;

DETAILED DESCRIPTION OF THE PREFERRED EMBODIMENTS

Figure 1:
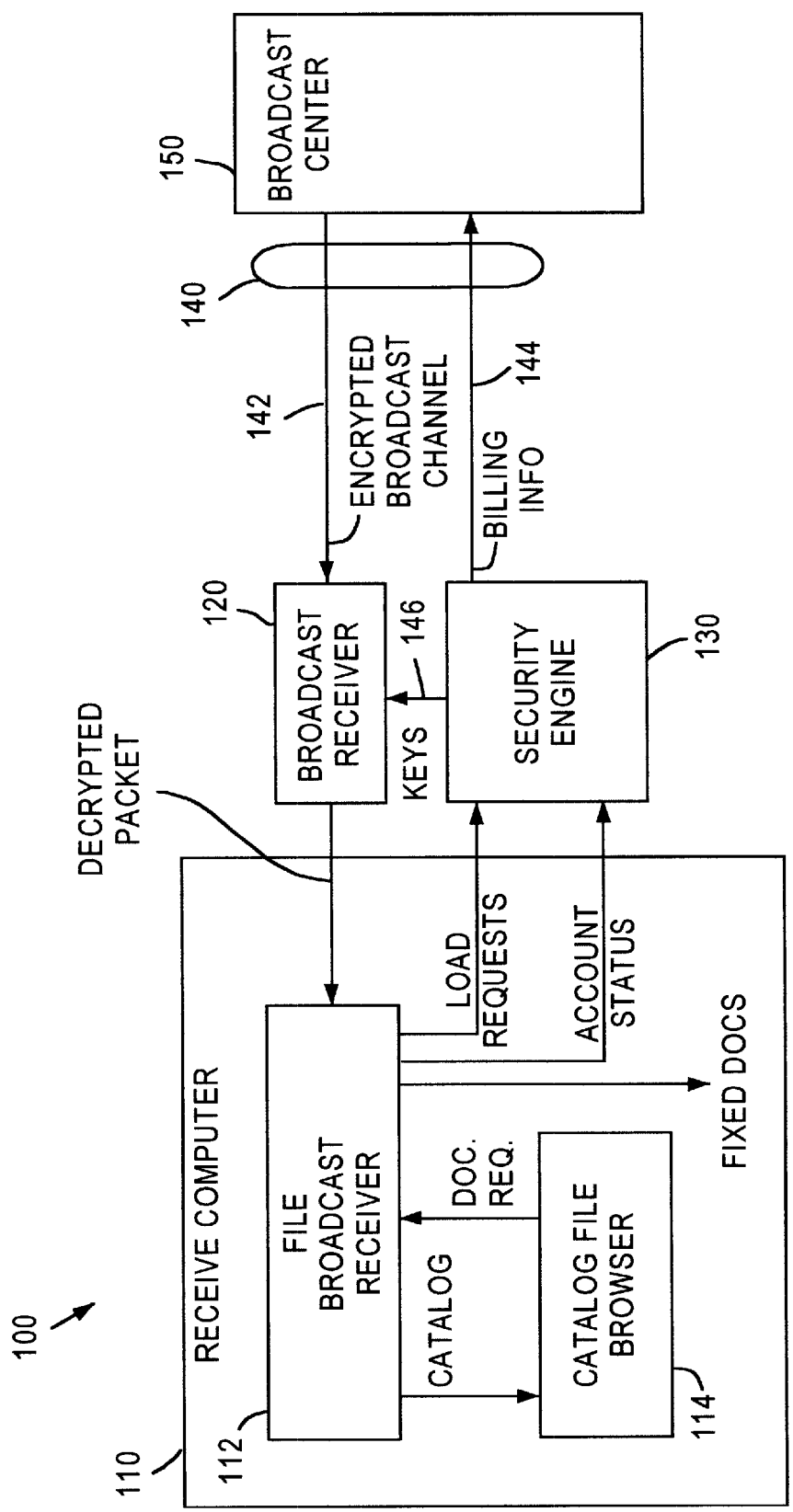
FIG. 1 is a hardware block diagram of a preferred embodiment of the invention.

Reference will now be made in detail to the preferred embodiments of the invention, examples of which are illustrated in the accompanying drawings. Wherever possible, the same reference numbers will be used throughout the drawings to refer to the same or like parts.

a. General Overview

The following is a general discussion of networking hardware used in a preferred embodiment of the present invention.

In a preferred embodiment of the present invention a communication link between a broadcast center computer and a plurality of document receiving computers is implemented using satellite technology to implement a high-speed one way link between the document receiving computer and the broadcast center. This high-speed link is used to download documents and data from the network. The receiving computer also has a conventional link such as a dial-up modem and telephone line sending data to the network. The invention can use various forms of high-speed, one-way links, such as satellites, and cable television lines. The invention can use various forms of low-speed networks, such as TCP/IP networks, dial-up telephones, ISDN D-channel, CPDP, and low-speed satellite paths.

The described embodiment of the present invention uses satellites to provide a high-speed one-way link. Satellites can cover large geographical areas and are insensitive to the distance between a transmitter and a receiver. In addition, satellites are very efficient at point-to-point applications and broadcast applications, and are resilient and resistant to man-made disasters. Two-way satellites are expensive to use, however, because of the costs involved in purchasing and installing satellite ground terminal hardware. In the past, these costs have placed satellite communications outside the reach of an individual consumer.

The present invention allows a personal computer to receive downloaded information from the network via a satellite at a very practical cost. In the present invention, the cost of satellite communications is reduced because a one-way satellite link is used. Receive-only earth station equipment is cheaper to manufacture because it requires less electronics than send/receive antennae.

b. The Electronic Document Delivery System

The following paragraphs present a brief overview of a preferred embodiment of the present invention. A more detailed description follows thereafter.

The present invention is an electronic document delivery system in which a central broadcast center broadcasts documents on a predetermined schedule. Documents can include various types of files or data, including software, images, text, and full-motion video. Periodically, a catalog of documents to be sent during an upcoming time period is sent by the broadcast center to a plurality of receiving computers. Users of the receiving computers, either human beings or other computers, designate which documents in the catalog they wish to receive. Sometime later, the broadcast center broadcasts, in encrypted form, each of the documents listed in the catalog. As each document is received by a receiving computer, the receiving computer determines whether one or more of its users have designated the document as a document from the catalog that they would like to receive. If the document was designated by the user, the receiving computer decrypts the document and stores billing information about the received document. The billing information will be transferred back to the broadcast center at a later time.

The following paragraphs provide a more detailed description of a preferred embodiment of the present invention. FIG. 1 is a hardware block diagram 100 of a preferred embodiment of the invention. FIG. 1 includes a receiving computer 110, which is one of the plurality of receiving computers, a broadcast receiver 120, a security engine 130, a communications link 140, and a broadcast center 150. Receiving computer 110 includes a file broadcast receiver 112 and a file browser 114.

Communications link 140 preferably is a combination of a satellite broadcast channel plus a dial-up telephone line. Another embodiment of the invention uses a vertical blanking interval of broadcast television to carry the broadcast data.

In FIG. 1, communications link 140 includes an incoming link 142 carrying encrypted and non-encrypted data packets and an outgoing link 144 carrying encrypted billing information as discussed below.

Figure 2:
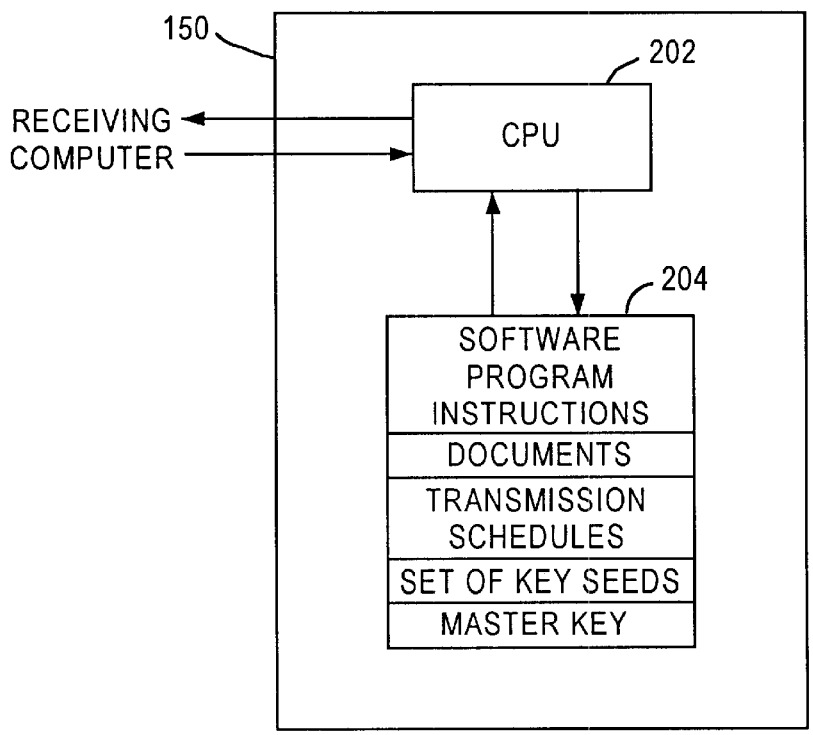
FIG. 2 is a detailed hardware block diagram of a broadcast center of FIG. 1.

FIG. 2 is a detailed hardware block diagram of broadcast center 150 of FIG. 1. As shown in FIG. 2, broadcast center 150 is preferably a general purpose computer including a CPU 202 and a memory 204. CPU 202 can be any type of known CPU that is capable of performing the functions described below in connection with broadcast center 150. Similarly, memory 204 is a generally known type of memory capable of holding information, such as RAM, ROM, a floppy disk, a hard disk, etc.

Memory 204 includes a software program that is executed by CPU 202 to perform functions F1, F2, F3, and F4, as described in connection with the table below. Memory 204 also includes a plurality of documents capable of being sent to ones of the receiving stations over communication link 140. Memory 204 also includes information about all documents available to be sent by broadcast center 150, such as document name, document length, origin of the document, ownership of the document, schedule on which the document is to be transmitted (e.g., periodically, or at a predetermined time or date), cost to a user of receiving the document, access control information indicating which receivers are authorized to receive the document, etc. The specific data and the format of the data stored in memory 204 may vary without departing from the spirit and scope of the invention. Memory 204 also includes a set of key seeds to be sent to security engine 130 of receiving computer 110, as described below.

Figure 3:
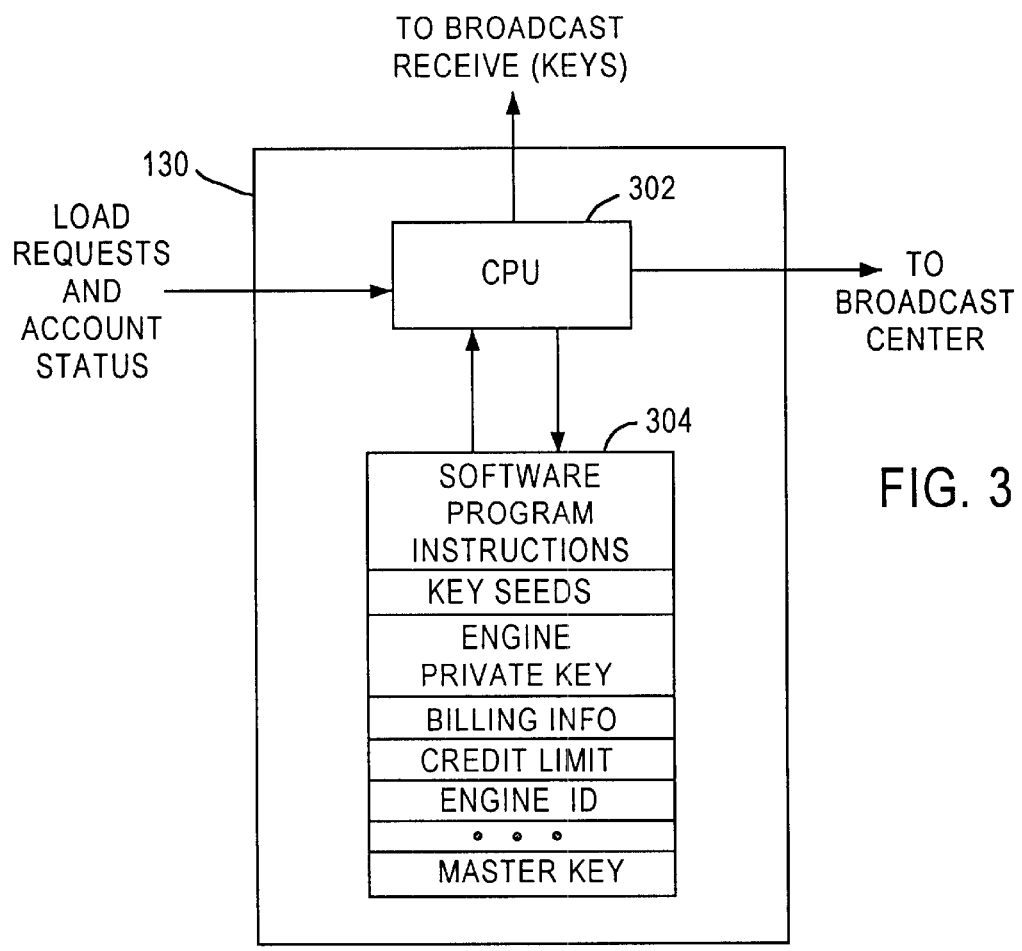
FIG. 3 is a detailed hardware block diagram of a security engine of FIG. 1.

FIG. 3 is a detailed hardware block diagram of security engine 130 of FIG. 1. As shown in FIG. 3, security engine 130 is preferably a general purpose computer including a CPU 302 and a memory 304. CPU 302 can be any type of known CPU that is capable of performing the functions described below in connection with security engine 130. Similarly, memory 304 is a generally known type of memory capable of holding information, such as RAM, ROM, a floppy disk, a hard disk, etc.

Security engine 130 preferably is a physically secure computer. Thus, it is physically locked or otherwise rendered physically inaccessible to unauthorized persons and its memory is not accessible to other computers or CPUs. Ensuring that security engine 130 is physically secure ensures that people only receive documents they will be billed for because the master key used to decrypt key sets and the key sets themselves are physically secure. A smart card is an example of such a security engine. Dallas Semiconductor "DS2252T Secure Micro Stik" is another. In one implementation of the invention, to reduce cost, link 144 is omitted and billing information is sent to broadcasting center 150 by way of receiving computer 110. In yet another implementation, the security engine may be integrated with the receiver to reduce cost and to maintain the secrecy of the keys.

Memory 304 includes a software program that is executed by CPU 302 to perform functions F10, F11, and F12 described in connection with the table below. A preferred embodiment of the present invention uses software based encryption because the amount of data to be encrypted and decrypted by the security engine is relatively small and relatively slow encryption and decryption is acceptable. In contrast, broadcast receiver 120 preferably implements a decryption algorithm in hardware using a symmetrical encoding scheme, such as the Data Encryption Standard (DES) Electronic Codebook implemented under Federal Standard 10-26, as shown in *Telecommunications: Compatibility Requirements for Use of Data Encryption Standards*, published Dec. 11, 1978 by the General Services Administration.

Memory 304 also includes an engine ID (a code uniquely identifying the security engine), an engine master key (for decrypting the account status information received from broadcast center 150 and for encrypting billing information and checksum to be sent to broadcast center 150), document ID data identifying a document requested by the user from the catalog (received as part of a load request), key seeds for generating keys to decode the documents listed in the catalog, account information received from broadcast center 150, billing information for documents received since billing information was most recently received from broadcast center 150, and a credit limit received from broadcast center 150. The specific data and the format of the data stored in memory 304 may vary without departing from the spirit and scope of the invention.

Figure 4:
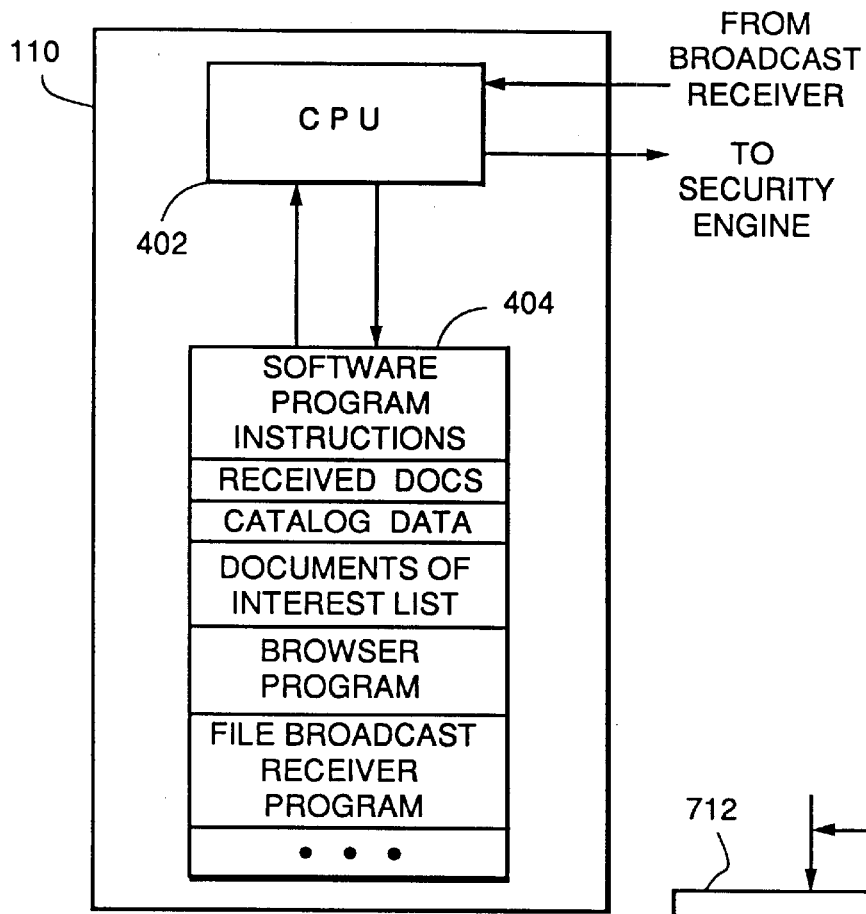
FIG. 4 is a detailed hardware block diagram of a receiving computer of FIG. 1.

FIG. 4 is a detailed hardware block diagram of receiving computer 110 of FIG. 1. As shown in FIG. 4, receiving computer 110 is preferably a general purpose computer including a CPU 402 and a memory 404. CPU 402 can be any type of known CPU that is capable of performing the functions described below in connection with receiving computer 110. Similarly, memory 404 is a generally known type of memory capable of holding information, such as RAM, ROM, a floppy disk, a hard disk, etc.

Memory 404 includes a plurality of software programs that are executed by CPU 402 to perform functions F7, F8, F9, F13, and F14 described in connection with the table below. As can be seen from FIG. 1, receiving computer 110 includes both file broadcast receiver 112 and file browser 114. Both file broadcast receiver 112 and file browser 114 preferably are implemented as a plurality of software programs stored in memory 404 that are executed by CPU 402. As also shown in FIG. 1, file broadcast receiver 112 performs all interfacing to the "outside world" that is performed by receiving computer 110. File browser 114 only receives data from and sends data to file broadcast receiver 112 (although browser 114 also receives data from users during times when users are designating documents from the catalog).

Memory 404 also stores received documents and catalog data (including the document name, the document length, the origin of the document, the ownership of the document, the schedule on which the document is to be transmitted, e.g., periodically, or at a predetermined time or date, the cost to a user of receiving the document, a description of the document sufficient to allow a user to determine whether he desires the document, etc.). Memory 404 also stores a list of "documents of interest" which are the names of the documents designated by users browsing the catalog, and the account status (whether there is any credit remaining) of the receiving computer's account. The specific data and the format of the data stored in memory 204 may vary without departing from the spirit and scope of the invention.

Figure 5:
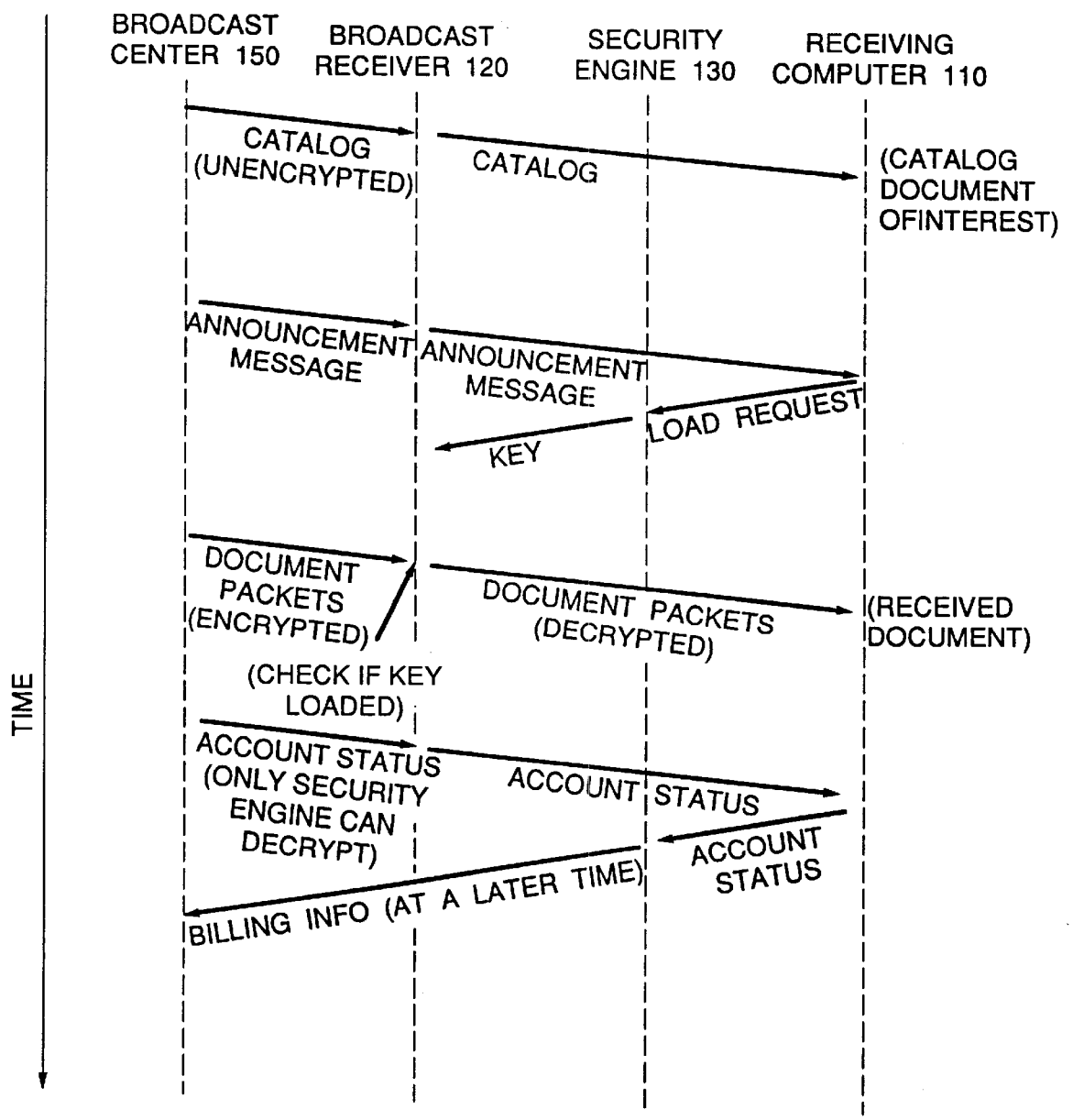
FIG. 5 is a timing chart showing the overall operation of the present invention.

The following paragraphs present an overview of the operation of the present invention with reference to the timing chart of FIG. 5. At a predetermined time interval, broadcast center 150 broadcasts the catalog "in the clear," i.e., in unencrypted form, to the plurality of receiving computers including receiving computer 110 using multicast addressing. The catalog preferably is broadcast in packet format. The described embodiment sends all packets in accordance with the IEEE 802.2 data communication standard. Broadcast receiver 120 receives the catalog and passes it to receiving computer 110. In receiving computer 110, the catalog is stored in memory 404, e.g., a hard disk. When a user, using file browser 114, designates a document from the catalog, broadcast file receiver 112 stores a document ID, e.g., a number or an unambiguous document name, in the list of "documents of interest" in memory 404.

Broadcast center 150 then proceeds to broadcast the documents listed in the catalog using multicast addressing. For each document, broadcast center 150 first multicasts an announcement message identifying the document to be sent next. The announcement message also includes a key seed ID identifying the key seed needed to decrypt the document. The announcement message is received and decrypted by broadcast receiver 120 and passed to file broadcast receiver 112. If the announced document is on the list of documents of interest, file broadcast receiver 112 sends a load request including the key seed ID to security engine 130. Security engine 130 determines if the user has sufficient credit and authorization to receive the document. If so, security engine 130 sends the key (obtained in accordance with the key seed ID) for the document to broadcast receiver 120.

After broadcast center 150 sends the announcement message for a document, it prepares to send the document itself. The document is packetized, encrypted, and broadcast over communications link 140. As broadcast receiver 120 receives each encrypted packet, it determines whether it is a packet for which broadcast receiver 120 has a key. Each document sent from broadcast center 150 is decrypted with a different key. If broadcast receiver 120 has received a correct key from security engine 130, it decrypts the packet and passes it to file broadcast receiver 112, where the packets of the received document are assembled in their correct order and stored in memory 404, e.g., on a hard disk. File broadcast receiver 112 then informs the user that the requested file has been received. In a preferred embodiment, all encryption is done using a symmetrical encoding scheme, such as the Data Encryption Standard (DES) method. Other embodiments may use a private key scheme for non-document data, e.g., billing information and key sets, sent between the broadcast center and the receiving station.

Another type of data transmitted by broadcast center 150 is account information. Account information is transmitted "in the clear," i.e., in unencrypted form, at least to the extent that broadcast receiver 120 does not decrypt it. The account information is passed through file broadcast receiver 112 and is passed to security engine 130 as account information. Security engine 130 decrypts the account information using a master key stored in memory 304. The account information includes key, seed, credit limit, etc. Since the account data is encrypted in a way that only the security engine 130 can decrypt, there is no need for the data to be further encrypted for transmission to the broadcast receiver 120. This allows for easier transmission of account information (the broadcast receiver 120 does not require a key to receive the account information) without compromising the security of the information (the data is still encrypted in a way that only the security engine 130 can decrypt).

Periodically, e.g., once a month, security engine 130 encrypts its billing information concerning documents received by receiving computer 110 during the past month and sends the encrypted billing information to broadcast center 150. This encryption is performed using a master key of broadcast center 150 that is stored in memory 304. This information may be encrypted using a symmetrical encryption method, such as DES or a private key method. Broadcast center 150 decrypts the received billing information using the master key and uses the decrypted information to send yet another updated account status to receiving computer 110.

The following table provides a list of the functions performed by the electronic document distribution system, according to which particular subsystem performs the function. These functions will be described in the following paragraphs, with reference to FIGS. 1–5:

TABLE

FUNCTIONS PERFORMED BY
ELECTRONIC DOCUMENT DISTRIBUTION SYSTEM

| SUB-SYSTEM | FUNCTION | |
|---|---|---|
| BROADCAST CENTER | Send catalog (non-encrypted) | (F1) |
| | Receive and decrypt billing information | (F2) |
| | Periodically send account status (non-encrypted) and key seeds (encrypted) | (F3) |
| | Send announcement message, and packetize, encrypt, and send document | (F4) |
| BROADCAST RECEIVER | Receive and store key from security engine | (F5) |
| | Receive packet and decrypt it if key is correct | (F6) |
| FILE BROADCAST RECEIVER | Receive announcement message and load request | (F7) |
| | Receive document request and store document ID on list of documents of interest | (F8) |
| | Receive and process decrypted packet from broadcast receiver | (F9) |
| SECURITY ENGINE | Receive accounting statistics and key seeds and store them in memory | (F10) |
| | Periodically send billing information to broadcast center (encrypted) | (F11) |
| | Receive and process load request from file broadcast receiver | (F12) |
| CATALOG BROWSER | Receive and store new catalog | (F13) |
| | Display catalog and process document requests | (F14) |

Functions F1, F2, F3, and F4 are performed by the broadcast center 150 of FIG. 2. In executing function F1, broadcast center 150 broadcasts to all potential receiving computers a catalog listing all documents to be sent during an upcoming predetermined time period, e.g., over the next week. The catalog is sent "in the clear," i.e., unencrypted, because none of the receivers are charged a fee to receive the catalog and there is no reason to limit access to the catalog.

In executing function F2, broadcast center 150 receives encrypted billing information from security engine 130. Broadcast center 150 receives similar billing information from each receiving computer on the network. The billing information details which documents were received during the most recent billing period. The broadcast center 150 decrypts the billing information using a private key and stores the decrypted billing information in memory 204 to be used later in determining an account status and for actually invoicing the user for documents delivered.

In executing function F3, broadcast center 150 periodically, e.g., monthly, sends account status information to each of the plurality of receiving computers, including receiving computer 110. The account information is tailored to the receiving computer and includes a statement of its receiver's status (e.g., satisfactory, overdrawn, limited access, etc.). The account information also includes core information required by security engine 130 to create keys to decrypt electronic documents. Although the account information is broadcast in the clear, the contents of the account information is encrypted in such a way that only security engine 130 may access and decrypt the account information.

In executing function F4, broadcast center 150 determines that it is time to broadcast one of the documents listed in the catalog. Broadcast center 150 sends an announcement message, including a document ID for the document to be sent to all potential receivers the document ID identifying which key to use. The broadcast center 150 then packetizes, encrypts, and sends the document using an appropriate encryption key for that document. Each receiver has already decided whether it wishes to receive the transmitted document and thereafter be billed for the document.

Figure 6:
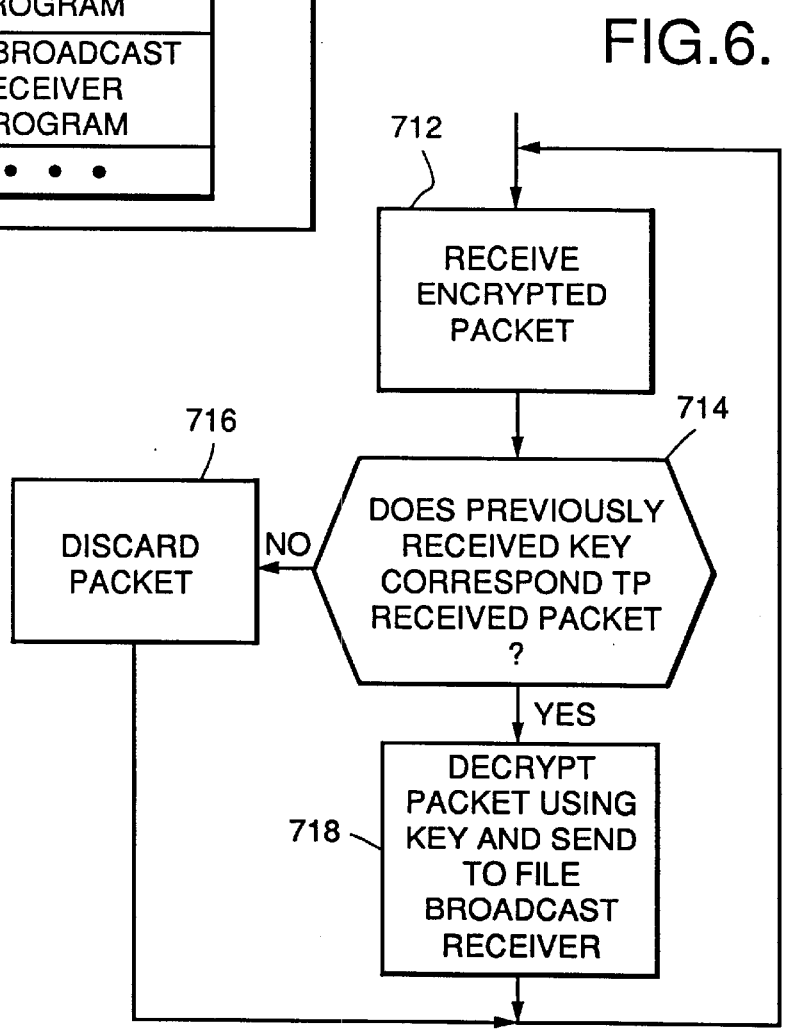
FIG. 6 is a flowchart of steps performed by the broadcast receiver of FIG. 1 in the function of receiving and decrypting packet information.

Functions F5 and F6 are performed by the broadcast receiver 120 of FIG. 1. FIG. 6 is a flowchart of steps performed in the execution of function F6.

In executing function F5, broadcast receiver 120 receives a key and a document ID for the document to be received next from security engine 130 on line 146 of FIG. 1. Note that the key is received only if the document is on the list of documents of interest in the memory of receiving computer 110, if an announcement message for the document was previously received from broadcast center 150, and if a load request was sent from file broadcast receiver 112 to the security engine 130. Furthermore, the security engine 130 must determine, using status and authorization information stored in its memory, that the user is authorized to access the document. The broadcast receiver 120 stores the received key in a memory or similar type of storage.

The execution of function F6 will be described with reference to FIG. 6. In step 712 of FIG. 6, broadcast receiver 120 receives an encrypted packet sent during the execution of function F4. In step 714, broadcast receiver 120 determines whether it has a key for the received packet. (The document ID is contained in each packet.) If so, broadcast receiver 120 decrypts the received packet in step 718 using the key received during the execution of function F5. Thus, each packet is decrypted as it is received and it is not necessary to store an entire encrypted document or large parts of an encrypted document before the document is decrypted. This immediate decryption results in a savings of memory space in memory 404 because an encrypted and a decrypted version of the same document do not have to simultaneously reside on a disk or in memory. If a corresponding key is not loaded, the received packet is discarded in step 716. In either case, control returns to step 712 to await more data.

Functions F7, F8, and F9 are performed by the file broadcast receiver 112 of FIG. 1. FIGS. 7(*a*) and 7(*b*) are flowcharts of steps performed in the execution of functions F7 and F9, respectively.

The execution of function F7 will be described with reference to FIG. 7(*a*). In step 802 of FIG. 7(*a*), file broadcast receiver 112 receives the announcement message for a document and, in step 804, determines whether the document ID in the announcement message is contained in the list of documents of interest in memory 404. If so, file broadcast receiver 112 sends a load request to security engine 130 in step 806. The load request contains, e.g., the document ID from the announcement message, so that security engine 130 can send a corresponding key to broadcast receiver 120.

In the execution of function F8, file broadcast receiver 112 receives a document request from file browser 114 indicating a document in the catalog that the user wishes to receive. It should be noted that the user can be either a person interfacing with the file browser through a text or GUI interface or, alternately, that the user can be another computer or computer program interfacing with the catalog and file browser 114 through a predetermined protocol. The file broadcast receiver 112 then adds the document ID of the document designated by the user to the list of documents of interest in memory 404.

The execution of function F9 will be described with reference to FIG. 7(*b*). In step 822 of FIG. 7(*b*) file broadcast receiver 112 receives a decrypted packet from broadcast receiver 120. In accordance with a field in the received packet identifying the packet type, file broadcast receiver 112 performs one of three actions. In step 824, if the received packet contains account status information, file broadcast receiver 112 sends it to security engine 130. In step 826, if the received packet includes catalog information, file broadcast receiver 112 stores it in memory 404 and preferably informs file browser 114 that a new catalog has been received.

In step 828, if the received packet is a decrypted part of a document requested by the user, file broadcast receiver 112 stores the packet, along with other packets to recreate the requested document, and informs the user that the document has been received. Note that, once a document has been received and stored in memory 404 it may be processed and/or reviewed by a user without any interaction with broadcast receiver 120 or security engine 130.

As described above, file broadcast receiver 112 pieces electronic documents back together from individual broadcast packets. If the broadcast medium has a low enough bit error rate and a high enough availability, an electronic document will be correctly delivered after only one transmission. For broadcast media where this is not the case however, file broadcast receiver 112 and broadcast center 150 may use either of two techniques to ensure the reliable delivery of broadcast documents. In both cases, file broadcast receiver 112 stores the partially assembled document and a record of the missing pieces (gaps) within the document in a suitable memory. File broadcast receiver 112 fills in the gaps as the missing pieces are retransmitted by broadcast center 150. Security engine 130 keeps just a single billing record per document even if it receives repeated load requests for a single document. The two techniques are: 1) scheduled transmission, in which broadcast center 150 repeatedly transmits the entire document, i.e., transmits it several times in a row to fill in the gaps on the receive side, and 2) requested transmission, where file broadcast receiver 112 requests retransmission of just the gaps via a separate network. The separate network could be, for example, link 144 used for sending billing records to broadcast center 150 or some other link or communication channel.

Figures 8, 9:
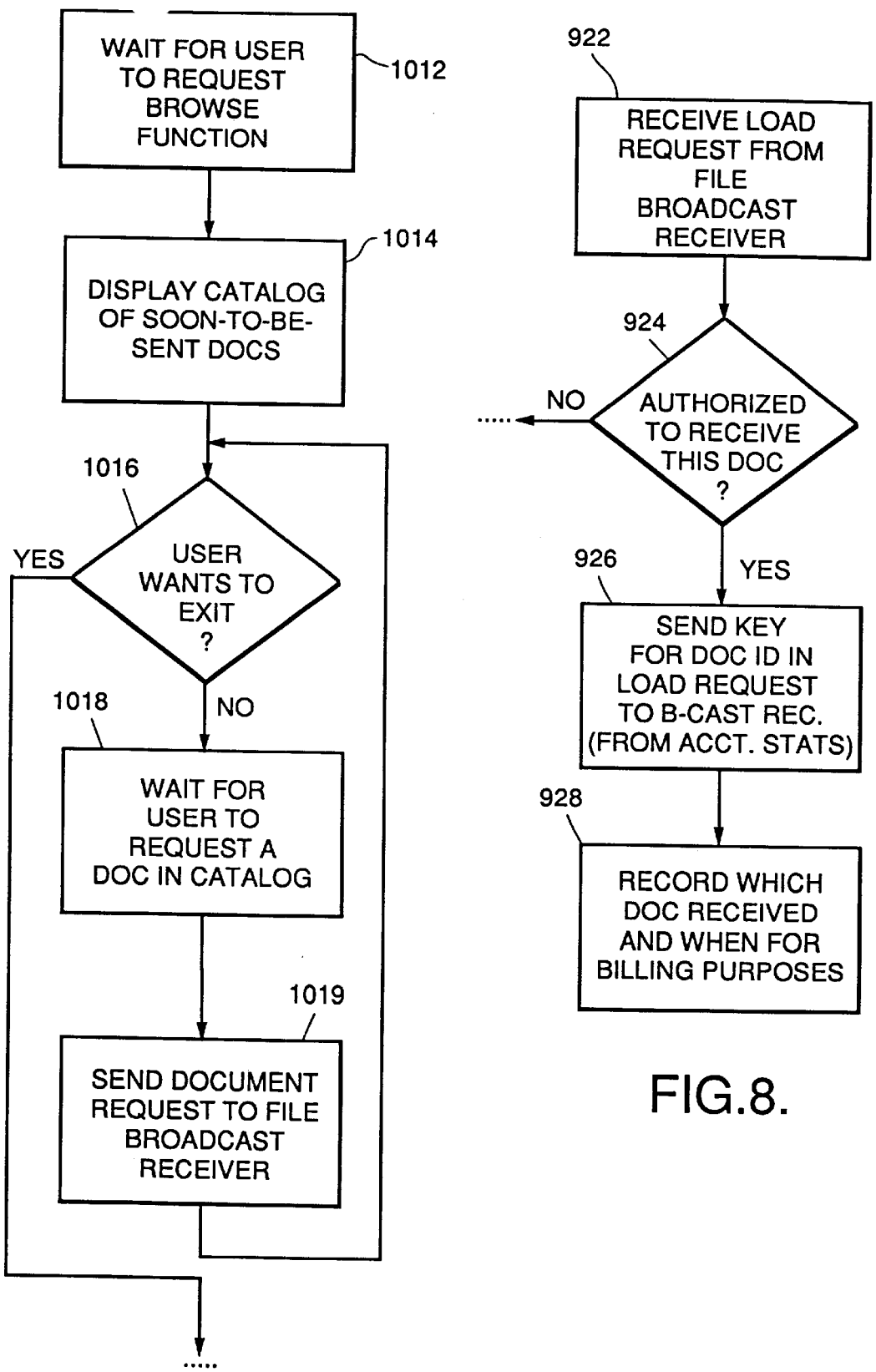
FIG. 8 is a flowchart of steps performed by the security engine of FIG. 3 in the function of receiving and processing a load request from the file broadcast receiver.
FIG. 9 is a flowchart of steps performed by the file browser of FIGS. 1 and 4 in the function of displaying a catalog and processing document requests.

Functions F10, F11, and F12 are performed by the security engine 130 of FIG. 1. FIG. 8 is a flowchart of steps performed by security engine 130 in the execution of function F12.

In the execution of function F10, security engine 130 receives account status information from broadcast center 150. The key seeds are an important component of the account information because the key seeds are used to produce the keys needed by broadcast receiver 120 for decryption of documents. The set of key seeds used by broadcast center 150 is changed periodically. Broadcast center 150 can disable a receiver's ability to receive by withholding key seeds.

When a load request is delivered to security engine 130, security engine 130 produces a key for decryption of the document from the contents of the announcement message and a key seed using a keyed one-way hash function. Keyed one-way hash functions produce an output that is a function of both an input string (e.g., a document ID) and a key (e.g., a key seed). Thus, only someone with the key can calculate the hash output value. One type of a keyed one-way hash function is called a "MAC," which stands for Message Authentication Code.

The following paragraphs describe two keyed one-way hash functions that are preferably used in various implementations of the present invention. A first function encrypts a message with a block algorithm in CFB mode. The hash is the last encrypted block encrypted once more in CFB mode. This technique is described in ANSI X9.9 and ISO 9797, both of which are herein incorporated by reference. A second function is called RIPE-MAC and uses DES (Data Encryption Standard). More details of this function can be found in the book "Applied Cryptography" by Bruce Schneier, which is incorporated by reference. Other hash functions could also be used to implement the invention.

The keyed one-way hash function is also used to create a "checksum" for the billing report. The checksum can be created only with the key. When broadcast center 150 receives a billing report with a valid checksum, the checksum ensures that the report was created by a party having the key. As long as the key is kept private in broadcast center 150 and in security engine 130, falsified or modified billing information can be detected by broadcast center 150.

In the execution of function F11, security engine 130 periodically, e.g., monthly, sends billing information to broadcast center 150. The billing information details which documents were received (by document ID) and when they were received during the billing period. Security engine 130 encrypts the billing information using a public key of broadcast center 150. Alternately, the billing information may be protected by a checksum but not encrypted. The public key is part of the account information sent to security engine 130 in encrypted form. Security engine 130 reports billing information to broadcast center 150 under several circumstances, periodically, on receipt of a message requesting that billing information be sent, when the billing record is reaching a predetermined memory capacity, or when the credit limit is close to being reached.

The execution of function F12 will be described with reference to FIG. 8. In step 922 of FIG. 8, security engine 130 receives a load request from file broadcast receiver 112. In step 824, security engine 130 checks the credit limit and authorization status of receiving computer 110. If receiving computer 110 is authorized to receive the requested document, security engine 130, in step 926, sends a key and a document ID from the account information in memory 304 corresponding to a document ID in the load request to broadcast receiver 120. In step 928, security engine 130 records the document ID of the document to be received into memory. This information is periodically sent to broadcast center 150 for billing purposes. Security engine 130 also maintains a running credit limit value in memory. The credit limit is debited when document requests are made and credited on receipt of account status information indicating the receiver has paid all or part of its bill.

Functions F13 and F14 are performed by the file browser 114 of FIG. 1. FIG. 9 is a flowchart of steps performed by file browser 114 during the execution of function F14.

In the execution of function F13, file browser 114 receives new catalog data from file broadcast receiver 112 and stores the catalog information in memory 404. Alternatively, file broadcast receiver 112 handles storing the catalog information in memory and merely informs file browser 114 that a new catalog has been received.

The execution of function F14 will be described with reference to FIG. 9. In step 1012 of FIG. 9, file browser 114 waits for a user to request a "catalog browse" function. When such a request occurs, file browser 114 in step 1014 displays all or part of the current catalog and allows the user to browse through the catalog using a known user interface. A catalog may contain hundreds or thousands of entries. After the catalog is displayed, the user may in step 1016 choose to exit the system. If the user stays, then in step 1018 the user designates one of the files in the catalog stored in memory 404. In step 1019 file browser 114 sends a document request to file broadcast receiver 112 containing a document ID corresponding to the document designated by the user. As discussed above, a document request causes file broadcast receiver 112 to issue a load request to security engine 130, which sends a key to broadcast receiver 120 so that broadcast receiver 120 will decrypt the packets of the document when they are received.

Thus, use of a catalog in the present invention presents a convenient method for a user to determine which documents to receive. Use of a catalog also allows the user to completely control which documents are received and thus prevents wasting resources on the reception of documents not of interest.

In summary, in the present invention, billing information is stored in a secure fashion in security engine 130 and sent periodically to broadcast center 150. The billing information is protected against tampering by a keyed checksum using a key known only by the security engine 130 and the broadcast center 150. In addition, the billing information includes an encrypted checksum. Encryption of the billing information makes it more difficult for users to falsify their billing information and makes it simpler for a central billing authority to detect tampering with billing information.

The security of the present invention depends on keeping the "engine private key" private, both within broadcast center 150 and within security engine 130. The engine private key is used to decrypt the account information sent from broadcast center 150 to security engine 130 and should it become known, unauthorized users would gain access to the key seeds needed to decrypt documents.

The present invention is very secure. The only keys that appear "in the clear" where they could be misappropriated are the keys for documents for which the user is being billed, i.e., keys sent to broadcast receiver 120. This key is of limited value because the user will soon have a complete copy of the document corresponding to the key.

Other embodiments will be apparent to those skilled in the art from consideration of the specification and practice of the invention disclosed herein. It is intended that the specification and examples be considered as exemplary only, with a true scope of the invention being indicated by the following claims.

What is claimed is:

1. A receiving computer in a communication system having a broadcast center that repeatedly sends a document, according to a predetermined schedule, as a plurality of packets, said receiving computer comprising:

a memory; and a broadcast receiver for, on a packet-by-packet basis, both receiving and decrypting each packet as it is received and storing the decrypted packet in said memory, wherein said broadcast receiver stores the decrypted packets in said memory so as to reassemble the document in order, and wherein when an encrypted packet from a sending of the document is not received, said broadcast receiver receives the packet from a subsequent sending of the document in the predetermined schedule and decrypts the packet so as to fill in a gap in the reassembled document.

2. A receiving computer in a communication system having a broadcast center that sends a document as a plurality of encrypted packets over a communication link, the receiving computer comprising:

a broadcast receiver for receiving the encrypted packets without storing the entire document in encrypted form;

a memory; and a security engine, wherein the broadcast receivers, on a packet-by-packet basis, decrypts packet as it is received and s the decrypted packets in the memory, wherein the security engine uses account information to generate keys used by the broadcast receiver to decrypt the received packets, wherein the broadcast receiver stores the decrypted packets in the memory so as to reassemble the document in order, and wherein when an encrypted packet from a sending of the document is not received, the broadcast receiver requests retransmission of the packet so as to fill in a gap in the reassembled document.

3. A receiving computer in a communication system having a broadcast center that sends (a) a document as a plurality of encrypted packets and (b) account information, the receiving computer comprising:

a broadcast receiver including means for receiving the packets for a document over a satellite link at a first time without the receiving computer sending a request for the document to the broadcast center;

a memory;

key generation means for using the account information to generate keys used by the broadcast receiver to decrypt and store in the memory the packets at the first time without the receiving computer sending a request for the document to the broadcast center; and billing information sending means for providing encrypted billing information to the broadcast center over a nonsatellite communication link at a time later than the first time, wherein the broadcast center sends the document according to a predetermined schedule using multicast addressing.

4. A receiving computer according to claim 2, wherein the account information is sent by the broadcast center to said receiving computer over the communication link.

5. An apparatus comprising:

receiving means for receiving from another apparatus (a) a plurality of encrypted documents, wherein each of the plurality of encrypted documents is to be decrypted using a respective key seed and (b) a plurality of key seeds, wherein said receiving means receiving means receives the plurality of key seeds from the another apparatus, without sending a request for the plurality of encrypted documents to the another apparatus, before receiving the plurality of encrypted documents from the another apparatus;

selecting means for selecting at least one of the plurality of encrypted documents received by said receiving means to be decrypted; and decrypting means for decrypting the at least one document selected by said selecting means, without sending a request for the at least one document to the another apparatus, in accordance with a determination as to whether a key seed corresponding to the selected document has been received by said receiving means, whereby decryption of a document by said decrypting means is enabled by receipt of a corresponding key seed from the another apparatus and is disabled by non-receipt of the corresponding key seed from the another apparatus.

6. An apparatus according to claim 5, further comprising catalog receiving means for receiving from the another apparatus a catalog of the plurality of encrypted documents before receiving the plurality of encrypted documents from the another apparatus, wherein said receiving means receives the plurality of encrypted documents and said selecting means selects the at least one of the plurality of encrypted documents from the catalog received by said catalog receiving means without said apparatus previously communicating the selection to the another apparatus.

7. An apparatus according to claim 5, wherein the at least one document selected by said selecting means comprises data or a file.

8. An apparatus according to claim 5, wherein the at least one document selected by said selecting means comprises one or more of text, software, an image, and video.

9. An apparatus according to claim 5, wherein the another apparatus transmits the plurality of encrypted documents to each of a plurality of apparatuses including said apparatus.

10. An apparatus according to claim 5, wherein the another apparatus transmits the plurality of encrypted documents to each of the plurality of apparatuses using multicast addressing.

11. An apparatus comprising:

document receiving means for receiving a plurality of documents from another apparatus, wherein the plurality of documents are sent from the another apparatus according to a predetermined schedule using multicast addressing;

selecting means for selecting at least one document of the plurality of documents to be decrypted;

key seed receiving means for receiving from the another apparatus a key seed for decrypting a document without said apparatus having sent a request for the document to the another apparatus; and decryption means for decrypting a document received by said document receiving means and selected by said selecting means, without said apparatus having sent a request for the document to the another apparatus, said decryption means decrypting the document by using a key seed received by said key seed receiving means, wherein said key seed receiving means receives from the another apparatus a key seed for decrypting a document before said selecting means selects a document to be decrypted and before said document receiving means receives the plurality of documents, including the document to be decrypted using the key seed, and wherein said apparatus sends information to the another apparatus that a document has been received by said document receiving means and decrypted by said decryption means after said decryption means decrypts the document.

12. An apparatus according to claim 11, wherein the plurality of documents received from the another apparatus comprise a plurality of different encrypted documents, each to be decrypted using a respectively corresponding one of a plurality of key seeds.

13. An apparatus according to claim 12, wherein said key seed receiving means receives the plurality of key seeds before said document receiving means receives the plurality of documents from the another apparatus.

14. An apparatus according to claim 11, further comprising catalog receiving means for receiving a catalog of the plurality of documents before said document receiving means receives the plurality of documents from the another apparatus.

15. An apparatus according to claim 14, wherein said selecting means selects at least one document of the plurality of documents from the catalog received by said catalog receiving means.

16. A method comprising the steps of:

receiving, at an apparatus, a plurality of documents from another apparatus, wherein the plurality of documents are sent from the another apparatus according to a predetermined schedule using multicast addressing;

selecting, at the apparatus, at least one document of the plurality of documents to be decrypted;

receiving, at the apparatus and from the another apparatus, a key seed for decrypting a document, prior to receipt, in said document receiving step, of the plurality of documents including a document to be decrypted using the key seed, and prior to said selecting step without the apparatus having sent a request for the document to the another apparatus;

decrypting, at the apparatus, a document received in said document receiving step using a key seed received in said key seed receiving step without the apparatus having sent a request for the document to the another apparatus; and sending information from the apparatus to the another apparatus that a document has been received in said document receiving step and decrypted in said decryption step after said decryption step decrypts the document.

17. A method according to claim 16, wherein the plurality of documents received in said document receiving step from the another apparatus comprise a plurality of different encrypted documents, each to be decrypted using a respectively corresponding one of a plurality of key seeds.

18. A method according to claim 17, wherein the plurality of key seeds are received in said key seed receiving step before the plurality of documents from the another apparatus are received in said document receiving step.

19. A method according to claim 16, further comprising a step, prior to receipt of the plurality of documents from the another apparatus in said document receiving step, of receiving a catalog of the plurality of documents, wherein said selecting step selects at least one document of the plurality of documents from the catalog received in said catalog receiving step.

20. A computer-executable program for use on an apparatus, the computer-executable program effecting a process comprising the steps of:

receiving a plurality of documents from another apparatus, wherein the plurality of documents are sent from the another apparatus according to a predetermined schedule using multicast addressing;

selecting at least one document of the plurality of documents to be decrypted;

receiving, from the another apparatus, a key seed for decrypting a document, prior to receipt, in said document receiving step, of the plurality of documents including a document to be decrypted using the key seed, and prior to said selecting step without the apparatus having sent a request for the document to the another apparatus;

decrypting a document received in said document receiving step using a key seed received in said key seed receiving step without the apparatus having sent a request for the document to the another apparatus; and sending information to the another apparatus that a document has been received in said document receiving step and decrypted in said decryption step after said decryption step decrypts the document.

* * * * *